Nov. 27, 1923.
G. W. PHILLIPS
1,475,351
SAW FILING RIG
Filed July 10, 1922
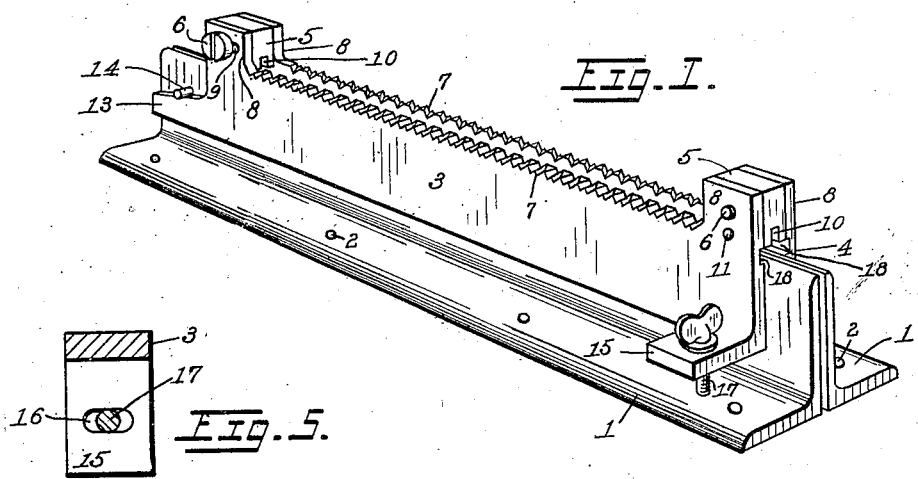
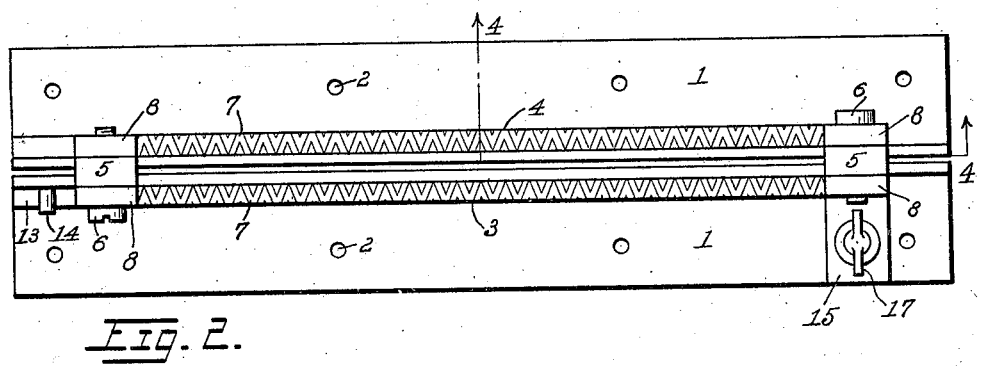
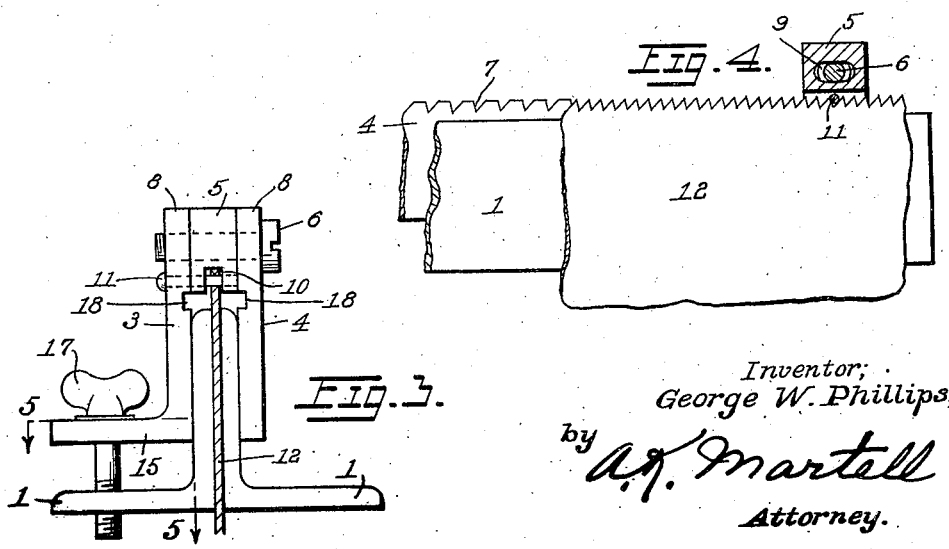
Inventor;
George W. Phillips,
by A. K. Martell
Attorney.

Patented Nov. 27, 1923.

1,475,351

UNITED STATES PATENT OFFICE.

GEORGE W. PHILLIPS, OF REGINA, SASKATCHEWAN, CANADA.

SAW-FILING RIG.

Application filed July 10, 1922. Serial No. 574,002.

To all whom it may concern:

Be it known that I, GEORGE W. PHILLIPS, a subject of Great Britain, residing at 1314 Cameron Street, Regina, Saskatchewan, Canada, have invented new and useful Improvements in Saw-Filing Rigs, of which the following is a specification.

My invention relates to improvements in saw filing rigs, and particularly to such devices as are provided with means for adjusting the angle of the file cut. The objects of my improvements are, first, to provide means for aligning the points of the saw teeth previous to sharpening; second, to afford facilities for filing the teeth in such a manner that they may be accurately spaced and sharpened to a correct and uniform cutting angle; and, third, to produce a device that is relatively simple, inexpensive, and easy to adjust to the requirements of the saw teeth to be filed.

Other objects and advantages will appear hereinafter, and while I herewith show, and will describe, a preferred form of construction, I desire to be understood that I do not limit myself to such preferred form, but that various changes and adaptations may be made therein without departing from the spirit of my invention as hereinafter claimed.

My objects are attained by the device illustrated in the accompanying drawing, in which:

Figure 1 is a perspective view of the entire rig; Figure 2 is a plan view of the device; Fig. 3 is an end elevation drawn to an enlarged scale; Fig. 4 is a fragmentary sectional detail taken on the line 4—4 of Fig. 2, and looking in the direction indicated by the arrow heads and Fig. 5 is a fragmentary detail taken on the line 5—5 of Fig. 3. Fig. 4 is drawn to the same scale as Figs. 1 and 2, and Fig. 5 is drawn to the same scale as Fig. 3.

Similar numerals refer to similar parts throughout the several views.

The pair of clamping members 1 are preferably made of standard structural angle steel. Each is provided with holes 2 in one of its flanges for convenient attachment to a standard saw filing vise, such as is commonly used in this art. So attached these members 1 become, in effect, extensions of the jaws of the saw filing vise, and serve to clamp the saw while being filed.

The filing members 3 and 4 are spaced by blocks 5, and assembled and held in proper relation by the screws 6. Members 3 and 4 each have two series of notches, or grooves, 7 cut in its upper edge for the purpose of positioning and guiding the file when sharpening a saw. These notches are accurately pitched to correspond to the number of teeth per inch of the saw to be filed. They are so shaped that the file will be rotated to the proper angle before commencing its longitudinal motion, so that the proper shape may be imparted to the saw teeth. Moreover each series of notches is cut at an angle relative to the perpendicular to the planes of members 3 and 4, to provide the proper clearance angles for the cutting edges of the saw teeth. It will be evident, therefore, that these respective series of notches partially intersect on each of the filing members, as indicated in Figs. 1 and 2.

Members 3 and 4 have vertically projecting lugs 8 at each of their respective ends for assembling these members above the plane of the saw teeth. In the case of each member one of these lugs is tapped for one of the assembling screws 6, and the other lug has a slot for the reception of the other screw. These slots are shown at 9. This construction enables a longitudinal adjustment of the members to be made with respect to each other, and provides for slightly varying, or correcting, the clearance angles of the saw teeth.

The spacing blocks 5 have slots 10 in their lower surfaces to center the saw between members 3 and 4. Pin 11 passes through one of the lugs 8 and through slot 10 in one of the spacing blocks. This serves to position the teeth of the saw relative to the filing notches by taking its place between two adjacent saw teeth, as shown in Fig. 4. A fragment of the saw is shown at 12.

At least one of the filing members 3 or 4, has a longitudinally sloping lug 13 at one end. This is adapted to engage the holding down pin 14. At the other end of this member a transversely projecting lug 15, with a longitudinally disposed slot 16 as shown in Fig. 5, serves to clamp down the filing member assembly by means of the wing bolt 17.

At one end of the filing member assembly, the pair of vertical lugs have opposed horizontal grooves cut in their inner surfaces, as shown at 18. This is for the purpose of holding a flat file for aligning the points of the saw teeth previous to sharpening. By loosening screw 6 the flat file may be inserted in grooves 18 and tightening the screw will hold it firmly in place. If wing bolt 17 is removed, the whole filing assembly may then be reciprocated back and forth over the saw teeth, and the points of these will be aligned in this manner by means of the flat file.

In operation, the points of the saw teeth, when they require it, are first aligned in the manner just described. The flat file is then removed, screw 6 tightened, and the filing assembly is positioned on the saw by means of pin 11, and clamped down by wing bolt 17. The teeth of the saw may then be sharpened by filing in the usual manner, allowing the file to be guided by notches 7.

Filing members 3 and 4 are preferably made of steel and, after the notches are cut therein, their upper edges should be case hardened to prevent the notches being injured or destroyed by the action of the file.

Having thus fully described my invention and its manner of use, I claim:

1. A saw filing device comprising clamping jaws; spaced opposed filing members so assembled that their relative position is adjustable longitudinally and having intersecting series of file guiding notches on their upper edges; and means for attaching said filing members to said jaws.

2. A saw filing device comprising clamping jaws adapted for attaching to a vise; opposed filing members which are adjustably positioned longitudinally and having intersecting file guiding notches in their upper edges, said members being adapted for straddling said jaws; and means for adjustably attaching said members to said jaws.

3. In a saw filing device, opposed filing members having file guiding notches in their upper edges and file holding notches in one end, said holding notches being adapted for holding a file horizontally and parallel with the planes of said members; and means for clamping a file in said holding notches.

4. In combination with saw clamping jaws, a pair of opposed members adapted to straddle said jaws to slide thereon; file holding notches in one end of said members; and means for clamping a file in said notches.

5. In combination with saw clamping jaws, a pair of opposed spaced members adapted to straddle said jaws to slide thereon; file holding notches in said members; means for clamping a file in said notches; intersecting series of angular file guiding notches in the edges of said members; and means for holding said members in fixed position relative to said jaws.

GEORGE W. PHILLIPS.